Feb. 28, 1961 M. S. ARIENS ET AL 2,972,850
RIDABLE POWERED IMPLEMENT
Filed Jan. 16, 1959 2 Sheets-Sheet 1

INVENTORS
Mando S. Ariens &
Willard O. Tschantz,
BY
Morsell & Morsell
ATTORNEYS.

Feb. 28, 1961  M. S. ARIENS ET AL  2,972,850
RIDABLE POWERED IMPLEMENT
Filed Jan. 16, 1959  2 Sheets-Sheet 2

INVENTORS
Mando S. Ariens &
Willard O. Tschantz,
BY
Morsell & Morsell
ATTORNEYS.

United States Patent Office 2,972,850
Patented Feb. 28, 1961

2,972,850
RIDABLE POWERED IMPLEMENT

Mando S. Ariens, West De Pere, and Willard O. Tschantz, Brillion, Wis., assignors to Ariens Company, Brillion, Wis., a corporation of Wisconsin Filed Jan. 16, 1959, Ser. No. 787,251

3 Claims. (Cl. 56—25.4)

This invention relates to improvements in ridable powered implements, and more particularly to a ridable powered implement having connecting linkage forming an adjustable mounting for the implement or tool element.

In our co-pending application, Serial No. 756,895, filed August 25, 1958, there is disclosed a tractor-mounted implement in which the implement is carried by a wheeled frame or carriage which is disconnectably associated with a rearwardly mounted tractor unit and which is so mounted relative to the tractor unit that the implement carrying frame or carriage is free to oscillate vertically to conform with changing ground contours.

In the present invention the ridable powered implement assemblage includes a wheeled, motorized tractor, a carriage disconnectably associated with the rearwardly mounted tractor unit and having a wheeled front axle, and an implement slung from the carriage. The ridable powered implement of the present invention is an improvement over that disclosed in the aforementioned co-pending application in that the implement, underlying the main longitudinal frame bar of the carriage, is both detachably and adjustably connected with the carriage and the tractor-carried prime mover and the sling and implement carried thereby may rock fore and aft and bob up and down relative to the carriage both at its front and rear ends with a jack-knife action.

The present invention finds particular utility in connection with a powered ridable assemblage in which the implement is a horizontal rotary type of mower which, to operate most efficiently, must follow the ground contour, and a particular object of the present invention is to provide linkage and connections associating the mower or implement with the front axle unit of the carriage in such a manner that the work surface of the mower will normally follow the ground in parallel relation to the surface thereof, and which may be readily adjusted upwardly and downwardly parallel to the ground to control the cutting or working height of the mower or implement, the linkage and connections additionally permitting the front end of the implement to float up and down in conformity with irregularities in the ground contour independent of the wheel-supported rear end of the implement, and vice versa.

A further, more specific object of the invention is to provide, in a ridable powered implement of the character described, connections between the mower or implement and the front axle unit of the carriage which permit vertical adjustments of the implement while maintaining the latter in parallel relation to the surface of the ground in all positions of height adjustment.

A further, more specific object of the invention is to provide a ridable powered implement wherein the carriage-mounted implement, such as a horizontal type mower, can be adjusted to a preset height or elevation and which is so connected with the carriage that the implement or mower pan can, at its extremities, float upwardly or downwardly to conform with rough terrain, following which the implement pan will automatically assume its preset height adjustment in parallel relation to the ground.

A further object of the invention is to provide a ridable powered implement of the character described in which the mower or tool may be quickly detached from the front axle unit of the carriage or longitudinally adjusted relative thereto.

A further object of the invention is to provide an articulated tractor-carriage-implement assemblage wherein the units are readily adjustable and separable with the implement carriage being so associated with the tractor and so mounted that the implement oscillates up and down in conformity with the ground contour and the implement can also float and oscillate fore and aft to conform to irregularities in the terrain; which is efficient in use; which is comfortable and easy to ride and operate; which is strong and durable; and which is well adapted for the purposes described.

In the accompanying drawings in which the same reference characters indicate the same parts in all of the views.

Figure 1:
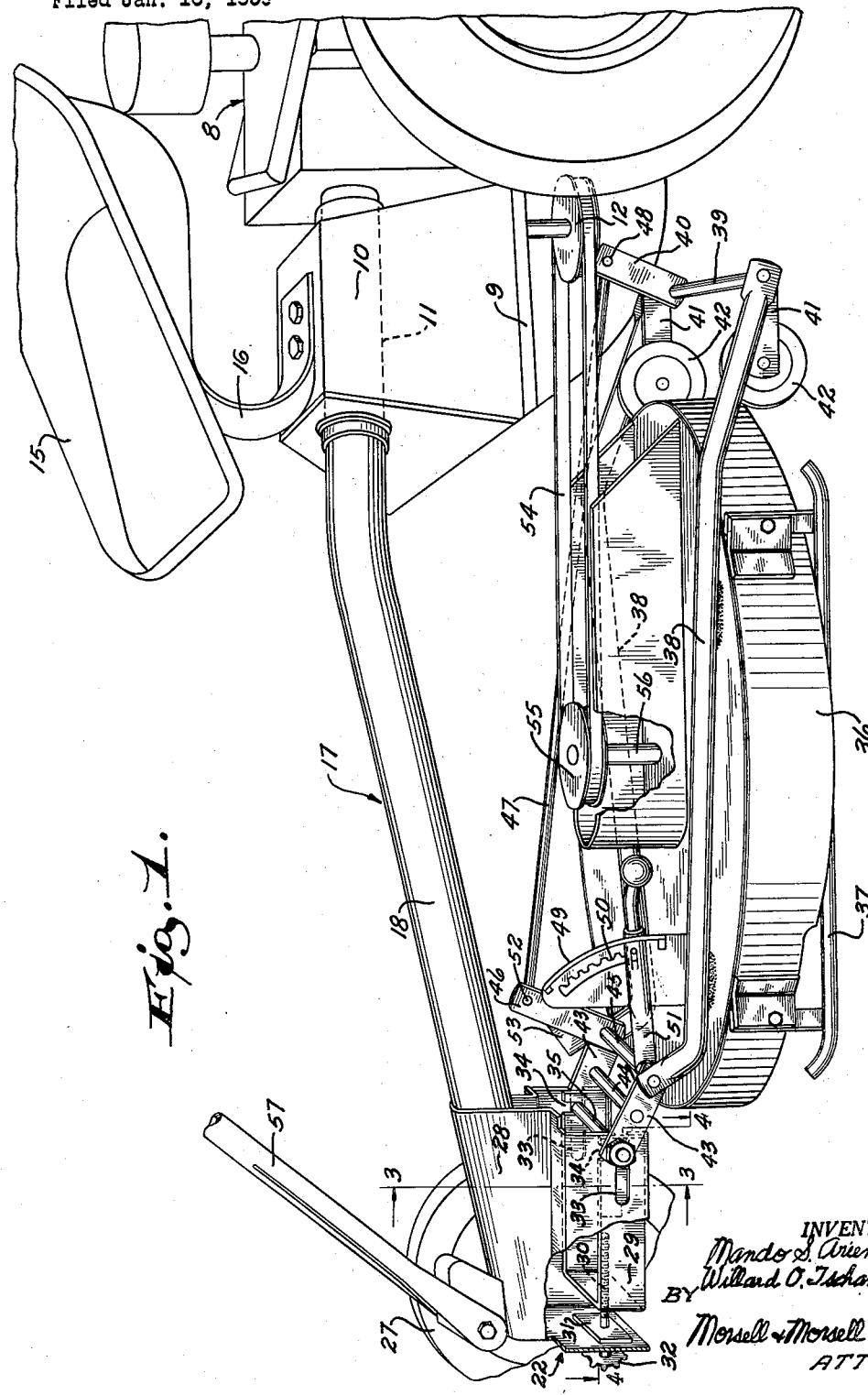
Fig. 1 is a side perspective view of the improved ridable powered implement wherein the implement takes the form of a horizontal rotary type mower, one of the front wheels of the front axle unit being omitted and other portions being broken away.

Essentially, the ridable powered implement assemblage is similar in its major respects to the tractor mounted implement illustrated in Fig. 1 of the Ariens and Tschantz co-pending application, Serial No. 756,895 filed August 25, 1958 and is a continuation in part thereof. The rear portion of the assemblage is a standard two-wheeled internal combustion engine-powered tractor unit designated generally by the numeral 8. This tractor unit carries a forwardly extending horizontal platform 9 on which is rigidly mounted a coupling box 10 formed internally with a longitudinally extending horizontal open-ended sleeve 11.

Revolubly mounted on a vertical post projecting below the platform 9 is a horizontally disposed sheave 12 which is connected to and driven from the internal combustion engine (not shown) on the tractor unit by any conventional form of drive (not shown). A conventional seat 15 for the rider and operator of the ridable powered implement is mounted on the top of the box 10 by a spring bar 16.

The assemblage also includes an implement carrying frame or carriage which is designated generally by the numeral 17. This frame or carriage includes a longitudinally extending elevated bar 18 which, in its assembled relation to the tractor unit, is slightly forwardly downwardly inclined with a rear end portion bent substantially horizontally to revolubly extend through the sleeve 11 in the tractor carried box structure 10, being removably mounted in the sleeve 11 by means described in the aforementioned co-pending application.

The numeral 22 generally designates a front axle unit constructed as described in detail in said co-pending application and carrying steerable front wheels 27. The front axle unit includes a rigidly mounted upwardly projecting centrally located metallic housing 28 into which the forward end portion of the frame bar 18 extends and is secured by welding or the like. Hence, the frame bar 18 which serves as a longitudinal rib, has rigidly depending from its forward end the transverse front axle unit 22 on the axle of which the front steering wheels 27 are turnably mounted.

There is longitudinally slidably mounted within the lower portion of the front axle unit housing 28, a rearwardly opening U-shaped adjusting member 29 whose closed forward end is in screw threaded engagement with the shank portion 30 of an adjusting bolt which extends revolubly through the vertical front wall of the housing 22 and a bearing plate 31 carried on the inner side of the latter. The outer end portion of the adjusting bolt is formed with a hand knob 32 providing means whereby the bolt may be manually turned in one direction or the other to cause the adjusting U-member 29 to be pushed rearwardly or advanced forwardly within the housing 28. The rear side wall portions of the housing 28 are formed with longitudinal slots 33 which open at the rear end of the housing and which coincide with the lower ends of vertical slots 34 in the rear end portions of the side arms of the U-shaped adjusting member 29. Said slots 34 removably and turnably receive a transverse rod 35 which, when properly seated in said slots 34, registers at its end portions with the longitudinal slots 33 of the housing 22. Hence, when the adjusting bolt 30 is turned so as to draw the U-shaped adjusting member 29 forwardly from the quick detachable position of Fig. 2, to the position of Fig. 1, the transverse rod 35 slides at its end portions in said housing slots 33.

The numeral 36 designates the pan for the implement or tool of the assemblage which preferably houses a conventional rotary horizontal mower which is positioned so as to underlie the carriage bar 18 and to extend laterally therefrom on both sides uniformly. Affixed and depending from the mower pan 36 are a pair of longitudinally extending ground engaging skids 37 and the upper face of the mower pan has welded thereto a pair of spaced longitudinally extending pan carrying struts 38. The rear end portions of said struts 38 are directed outwardly and downwardly and are joined by a rotatable transverse shaft 39 on one end portion of which is rigidly affixed the lower end portion of a rear lever arm 40. Also rigidly affixed to opposite outer end portions of the rotatable shaft 39 are the rear end portions of caster wheel carrying arms 41 on the forward ends of which are journaled on transverse stud shafts small rear wheels or casters 42 which adjustably floatingly support the rear end portion of the implement pan 36.

The transverse rod 35 which engages in the slots 34 of the U-member 29 and in the longitudinal slots 33 of the housing 22 has pivotally mounted thereon the forward ends of a pair of laterally spaced-apart links 43 which are rigidly connected by an intermediate transverse bar 44. The rear end portions of the links 43 are pivotally mounted on opposite ends of a transverse shaft 45 whose outer ends also have rigidly affixed thereto the forward upturned end portions of the pan carrying struts 38. There is also rigidly mounted on the transverse shaft 45 the lower end portion of an upstanding lever arm 46 to which is pivotally affixed, as at 52, the angular inner end portion of an elongated connecting rod 47 whose rear end portion is pivotally connected to the upper end portion of the lever arm 40, as at 48.

The numeral 49 designates a quadrant affixed to and upstanding from the forward top surface of the mower pan 36. The serrated portion 50 of said quadrant is adapted to be releasably selectively engaged by a detent on a hand lever 51 whose forward end portion is mounted fast on the transverse shaft 45 so that when the hand lever 51 is moved twhrough an arc the transverse shaft 45 will be oscillated in one direction or the other so as to angularly swing the elements carried thereby such as the lever arm 46.

From the foregoing description it will appear that the mower pan 36 is, in fact, vertically adjustably carried by a system of levers and connections which, in effect, form a sling in the form of a parallelogram which includes the transverse shaft 45, the pivotal connection 52 between the lever arm 46 and the forward end of the connecting rod 47, the pivotal point 48 between the rear end portion of the connecting rod 47 and the upper end of the lever arm 40, and the rotatable transverse rear shaft 39 which carries the caster wheel mounting arms 41. Hence, when the hand lever 51 is moved arcuately along the quadrant 49 in one direction or the other, through this parallelogram sling arrangement of connections, the horizontal mower pan 36 will be raised or lowered parallel to the ground to regulate the height of the mower cut. Also through this parallelogram arrangement the mower pan 36 is free to float upwardly and downwardly parallel to the ground to follow its contour and, in this event, the laterally spaced-apart connected front links 43 can rock at their forward ends on the forward transverse rod 35 adjustably engaged within the U-member 29 and housing 28. Moreover, the mounting of the connected links 43 permits the same to pivot either on the front transverse rod 35 or the transverse rod 45 whereby the front of the mower pan or the rear of the mower pan may rock upwardly or downwardly to compensate for bumps in the terrain. After passing an obstruction, the mower pan can drop in a parallel manner to its preset height. With the caster wheels 42 at the rear of the mower housing rolling over the ground, up and down oscillating movements of the forward end of the mower pan are permitted through pivoting of the links 43 on the rod 35.

Figure 2:
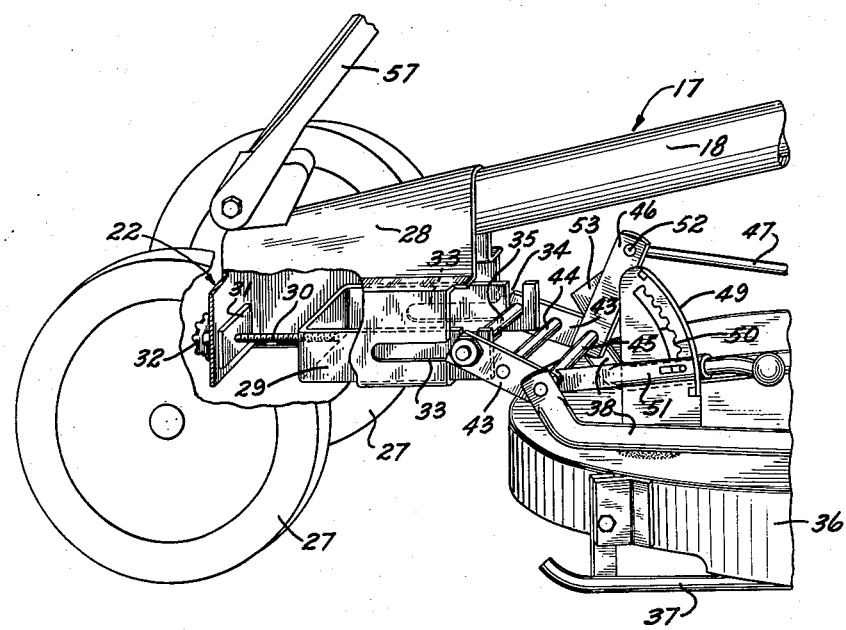
Fig. 2 is a fragmentary side perspective view of the front end portion of the ridable powered implement assemblage with portions broken away and in section, showing the adjustable connecting means between the front end portion of the implement and the front axle unit in a position of adjustment different from that of Fig. 1 to permit quick detachment of the implement from the carriage.
Figure 3:
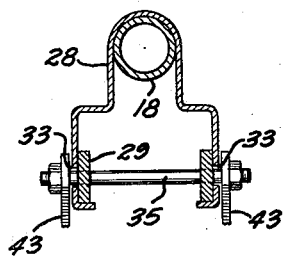
Fig. 3 is a vertical sectional view taken approximately along the line 3—3 of Fig. 1.
Figure 4:
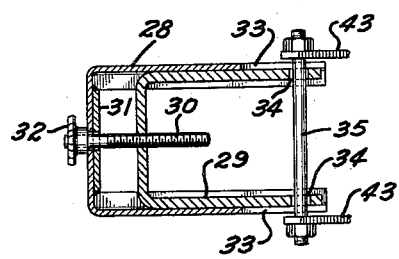
Fig. 4 is a horizontal sectional view taken approximately along the line 4—4 of Fig. 1.

When the upstanding lever arm 46 swings in an arc due to up and down movements of the mower housing 36 and corresponding movements of the set of connections therefor, or manipulation of the hand lever 51, movement of said lever arm 46 in a counterclockwise direction relative to Figs. 1 and 2 is limited by a stop 53 affixed to a forward edge of the lever arm 46 adapted to engage at its lower end a top surface of the adjacent link 43.

As was previously mentioned, the tractor unit 8 carries a driven sheave 12 which is engaged by an endless flexible belt 54 engaging a sheave 55 on the upper face of the housing 36 for the rotary mower. The shaft 56 carrying said sheave 55 is connected to and drives the horizontal rotary mower. By disengaging the belt 54 from the tractor carriage sheave 12, the rotary mower will be disengaged from the source of power when it is desired to detach the implement carriage 17 from the tractor unit by withdrawing the rear end of the bar 18 from the open-ended sleeve 11 within the coupling box structure 10, all of which is described in our aforementioned co-pending application.

Not only is the carriage quickly detachable from the tractor unit 8, but the implement housing 36 and its associated carrying elements are quickly disconnectable from the front axle unit 22 of the carriage 17. To accomplish this end, the screw 30 is adjusted to the position shown in Fig. 2 which projects the open end of the U-member 29 rearwardly and beyond the rear open end of the housing 28, thereby withdrawing the transverse shaft 35 from the longitudinal slots 33 of the housing and exposing the vertical slots 34 in the rear end portions of the arms of the U-member 29. Thereupon, by lifting the transverse shaft 35 out of the vertical slots 34, the linkage is completely disengaged from the front axle unit of the carriage, thereby disconnecting the implement and its carrying members from the front axle unit and from the carriage.

It is also possible to make fore and aft adjustments of the implement housing 36 relative to the front axle unit 22, which, among other things can tighten or slacken the power transmitting belt 54. For this purpose the U- adjusting member 29, through the bolt 30, can be slid longitudinally within the hollow base portion of the housing 28 with the transverse shaft 35 sliding in the housing longitudinal slots 33.

From the foregoing description it will be evident that the improved ridable powdered implement, as illustrated in Fig. 1, is adapted to be ridden by the operator who has control over the implement, propelled by the rearwardly disposed tractor unit, and the rotary mower is in operative connection with the prime mover of the tractor. When the engine of the tractor unit is in operation and advances the mower implement on the forwardly extending frame, the wheels 27 on the front axle unit may be turned for steering purposes by an upwardly and rearwardly extending handle bar 57 whose upper end portion (not shown) terminates adjacent the tractor carried operator seat 15, so as to be susceptible of being manually engaged and manipulated.

During the propulsion of the motorized assemblage, the mower or implement which is mounted on the under portion of the carriage by a sling arrangement will follow the contour of the ground being traversed, as previously described, as will the front axle unit. The implement housing 36 can be manually preset for a desired elevation relative to the ground being traversed, and as previously described, it can, according to ground conditions, rise in a plane parallel to the ground and return to its preset elevation, and it can also oscillate at its opposite ends. The main frame bar 18 of the carriage has its rear end portion mounted in the tractor box sleeve 11 for turning movement therein on a horizontal axis. Consequently, when the front axle wheels 27 and the skids 37 and casters 42 of the implement or mower ride on an incline or ground of uneven contour, in addition to the floating movement of the mower pan permitted by its mounting, an oscillation can be imparted to the carriage bar 18 which will permit the entire implement frame and parts carried thereby to oscillate in a vertical plane to conform with the changing ground contours.

The improved ridable powered implement, particularly adapted for lawn and garden usage, provides for the quick separation of the carriage from the tractor unit and of the implement from the front axle unit, or for longitudinal adjustments of the implement relative to the front axle unit, and for compensating oscillations and floating movements of the implement pan to follow the contour of the ground being worked over. The ridable powered implement is highly efficient in operation, is versatile in use, and is well adapted for the purposes described.

What is claimed as the invention is:

1. In a vehicular power implement assemblage which includes a wheeled, motorized tractor and a forwardly disposed carriage having a rigidly depended, wheeled, front axle unit and a longitudinal frame bar oscillatably and detachably coupled with the wheeled tractor and a ground engaging powered tool; an articulated equalizing sling for adjustably mounting the tool on the under portion of the carriage, pivotal supports for opposite ends of the sling including links pivotally connected with the front end portion of the sling and adjustably and pivotally connected to the front axle unit, and ground engaging wheel members rockingly carried by the rear end portion of the sling.

2. In a power operated mower, the combination of: a wheeled motorized tractor unit; a forwardly disposed carriage having a depended, wheeled front axle unit and a longitudinal frame bar at right angles to the front axle unit and rigidly connected at its front end to said front axle unit intermediate the ends of the latter, the rear end portion of said longitudinal frame bar being oscillatably coupled to the tractor unit to turn on an axis parallel to the direction of travel of the tractor unit to permit transverse tilting of the front axle unit in a vertical plane; a frame-like sling underlying said longitudinal frame bar rearwardly of the front axle unit; a horizontal mower housing rigidly depended from said sling; a link interposed between the front end portion of the sling and the front axle unit and pivotally connected at its opposite ends to both of the latter; and a ground engaging unit rockingly mounted on the rear end portion of the sling, the connections for said sling permitting it to jack-knife both fore and aft so that the mower housing may follow ground contours while rocking transversely with the carriage and front axle unit.

3. In a power operated mower, the combination of: a wheeled motorized tractor unit; a forwardly disposed carriage having a depended, wheeled front axle unit and a rectilinear longitudinal frame bar at right angles to the front axle unit and rigidly connected at its front end to said front axle unit intermediate the ends of the latter and forming therewith a T, the rear end portion of said longitudinal frame bar being oscillatably coupled to the tractor unit to turn with the front axle unit on an axis parallel to the direction of travel of the tractor unit to permit transverse tilting of the front axle unit in a vertical plane; a frame-like sling underlying said longitudinal frame bar rearwardly of the front axle unit; a horizontal mower housing rigidly depended from said sling; a pair of transversely spaced and rigidly connected together links interposed between the front end portion of the sling and the front axle unit and pivotally connected at their opposite ends to both of the latter on transverse axes; and a ground engaging unit rockingly mounted on the rear end portion of the sling, the connections for said sling permitting both the front and rear ends of the same to tilt vertically on transverse axes so that the mower housing may follow ground contours while rocking transversely with the carriage and front axle unit on a longitudinal axis.

References Cited in the file of this patent

UNITED STATES PATENTS

| | | |
|---|---|---|
| 2,763,977 | Spencer et al. | Sept. 25, 1956 |
| 2,801,510 | Colburn | Aug. 6, 1957 |
| 2,869,304 | Colburn | Jan. 20, 1959 |
| 2,924,928 | Rhoades et al. | Feb. 16, 1960 |
| 2,928,223 | Danuser | Mar. 15, 1960 |